United States Patent
Bieswanger et al.

(10) Patent No.: US 7,194,645 B2
(45) Date of Patent: Mar. 20, 2007

(54) METHOD AND APPARATUS FOR AUTONOMIC POLICY-BASED THERMAL MANAGEMENT IN A DATA PROCESSING SYSTEM

(75) Inventors: Andreas Bieswanger, Ehningen (DE); Lee Evan Eisen, Round Rock, TX (US); James Stephen Fields, Jr., Austin, TX (US); Michael Stephen Floyd, Austin, TX (US); Bradley David McCredie, Austin, TX (US); Naresh Nayar, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/054,261

(22) Filed: Feb. 9, 2005

(65) Prior Publication Data

US 2006/0178764 A1    Aug. 10, 2006

(51) Int. Cl.
*G06F 1/26* (2006.01)
*G01K 1/08* (2006.01)
*G01K 17/00* (2006.01)
*G05B 11/00* (2006.01)
*G05B 13/00* (2006.01)
*G05D 23/00* (2006.01)
*G05B 9/00* (2006.01)
*G06F 11/00* (2006.01)
*G06F 1/20* (2006.01)
*H05K 7/20* (2006.01)

(52) U.S. Cl. .................. 713/320; 702/132; 702/136; 700/21; 700/33; 700/81; 700/299; 714/47; 361/687; 361/688; 340/584

(58) Field of Classification Search .............. 700/11, 700/12, 21, 28, 32–35, 54, 79, 81, 299; 702/130, 702/132, 136; 713/300, 320, 322–324, 330, 713/340; 714/1, 2, 47, 23, 24; 340/500, 340/584; 361/687, 688
See application file for complete search history.

(56) References Cited

U.S. PATENT DOCUMENTS

| | | | | |
|---|---|---|---|---|
| 4,357,806 A | * | 11/1982 | Harris et al. | 62/186 |
| 6,082,623 A | * | 7/2000 | Chang | 236/49.3 |
| 6,172,611 B1 | * | 1/2001 | Hussain et al. | 340/584 |
| 6,194,858 B1 | * | 2/2001 | Chen | 318/473 |
| 6,411,156 B1 | * | 6/2002 | Borkar et al. | 327/534 |
| 6,442,700 B1 | | 8/2002 | Cooper | |
| 6,470,289 B1 | * | 10/2002 | Peters et al. | 702/132 |

(Continued)

FOREIGN PATENT DOCUMENTS

JP    08303881 A  *  11/1996

(Continued)

*Primary Examiner*—Crystal J. Barnes
(74) *Attorney, Agent, or Firm*—Duke W. Yee; Diana R. Gerhardt; Hope Shimabuku (57) ABSTRACT

A method, apparatus and computer instructions are provided to autonomically monitor and adjust system characteristics based on a customer optimization goal specified in a policy or profile. An autonomic management component is implemented in firmware comprising a set of control algorithms. Response to reading system characteristics from a plurality of sensors, the autononmic management component selects at least one control algorithm from the set and the control algorithm adjusts the parameters of the system characteristic to optimize performance according to the optimization goal specified by the customer.

20 Claims, 5 Drawing Sheets

U.S. PATENT DOCUMENTS

| | | | |
|---|---|---|---|
| 6,526,333 B1 * | 2/2003 | Henderson et al. | 700/300 |
| 6,636,910 B2 * | 10/2003 | Kung et al. | 710/60 |
| 6,889,332 B2 * | 5/2005 | Helms et al. | 713/322 |
| 6,996,441 B1 * | 2/2006 | Tobias | 700/44 |
| 7,043,650 B2 * | 5/2006 | Bresniker et al. | 713/324 |
| 2002/0138159 A1 * | 9/2002 | Atkinson | 700/21 |
| 2003/0217297 A1 | 11/2003 | Gschwind et al. | |
| 2005/0030171 A1 * | 2/2005 | Liu et al. | 340/500 |
| 2005/0049729 A1 * | 3/2005 | Culbert et al. | 700/50 |
| 2005/0288886 A1 | 12/2005 | Therien et al. | |
| 2005/0289489 A1 * | 12/2005 | Kim et al. | 716/4 |
| 2006/0193113 A1 * | 8/2006 | Cohen et al. | 361/687 |

FOREIGN PATENT DOCUMENTS

| | | |
|---|---|---|
| WO | WO 01/35200 A1 | 5/2001 |
| WO | WO 2005/017468 A2 | 2/2005 |

* cited by examiner

METHOD AND APPARATUS FOR AUTONOMIC POLICY-BASED THERMAL MANAGEMENT IN A DATA PROCESSING SYSTEM

BACKGROUND OF THE INVENTION

1. Technical Field

The present invention relates to an improved data processing system. In particular, the present invention relates to thermal management in a data processing system. Still more particular, the present invention relates to autonomic policy-based thermal management in a data processing system.

2. Description of Related Art

Management of thermal condition in a data processing system has becoming increasingly more difficult. As the number of processors in the data processing system continues to increase, the power consumed and wattage/heat dissipated by most of these processor chips also increase. The cooling of high frequency or high performance processors also becomes a challenge.

Typically, designers attempt to optimize a system by adjusting specific system characteristics, including increasing or decreasing performance, acoustics (noise), and power dissipation. In addition, depending on the customer need, one or more of the system characteristics may be optimized at the expense of another. For example, if the ambient temperature is cool or if the customer can ignore increased acoustics, the fan speed may be increased to cool the processors, such that the processors may run at a higher frequency to achieve a better performance.

Existing thermal management mechanisms allow designers to make necessary adjustments to system characteristics by hardwiring control algorithms into specific hardware. In this way, designers can monitor certain system characteristic and make adjustments according to the measurements. However, each of these thermal management mechanisms manages separate system characteristic. For example, a processor temperature controller is used only to monitor processor temperature. Thus, each controller component is hardwired to perform a specific task.

In addition, there is little or no communication between system firmware and the specific hardware for thermal management, since the controller components are all implemented in hardware. Furthermore, there is no capability for existing thermal management mechanisms to recognize optimization goals set up by the customer via profiles or system policies. Thus, system characteristics adjustments cannot be customized according to individual user need.

Therefore, it would be advantageous to have a method, an apparatus, and computer instructions for autonomic policy-based thermal management in a data processing system. In this way, monitoring and adjustment of system characteristics may be centralized and communications between hardware and system firmware may be increased to achieve policy-based customer goals.

SUMMARY OF THE INVENTION

The present invention provides a method, an apparatus, and computer instructions for autonomic policy-based thermal management. The present invention provides an autonomic mechanism that reads system characteristics from a plurality of sensors in the data processing system and selects at least one control algorithm from a set of control algorithms to manipulate the system characteristics based on a policy defined by a customer. The control algorithms then adjust parameters of the system characteristics according to a customer optimization goal specified in the policy.

In one embodiment, a control algorithm for optimizing performance adjusts the parameters by first determining if the temperature level is above a predetermined warning temperature. If temperature is above the warning temperature, the control algorithm decreases the voltage level and frequency level by a percentage until it hits a minimum acceptable operating voltage/frequency level and waits for a number of seconds.

However, if the temperature level is not above the warning temperature, the control algorithm increases the voltage level and frequency level by a percentage until it hits the maximum acceptable operating voltage/frequency level and waits for a number of seconds. Then, the control algorithm determines if the temperature is below the warning temperature before repeating the algorithm

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
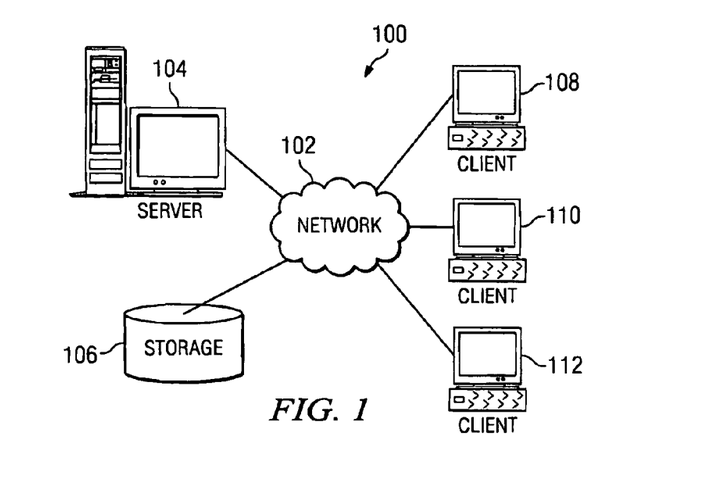
FIG. 1 is an exemplary diagram of a distributed data processing system as depicted in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
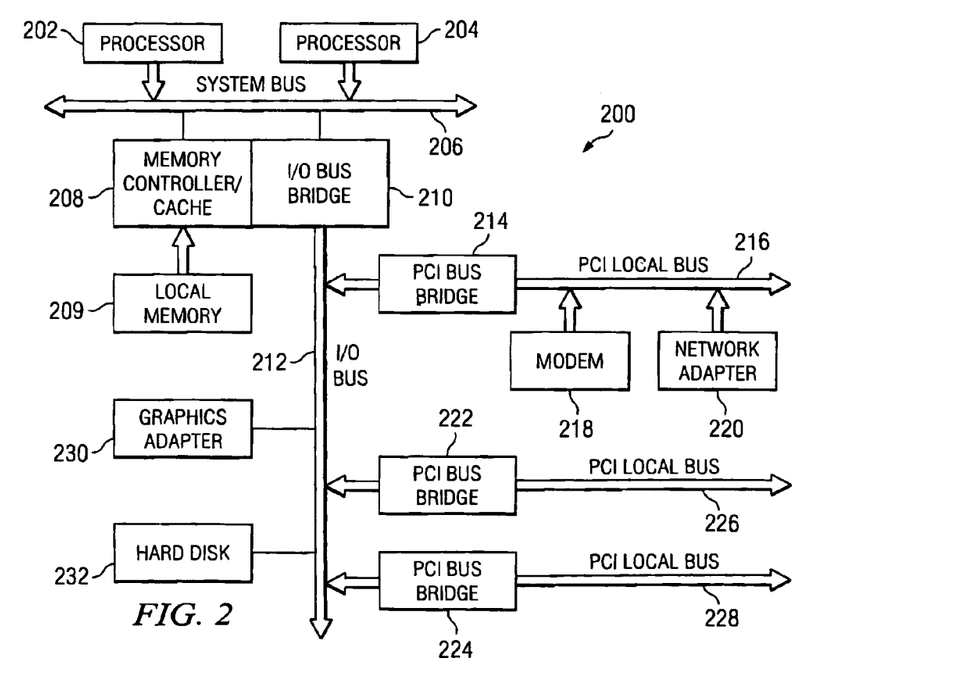
FIG. 2 is an exemplary diagram of a server computing system as depicted in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
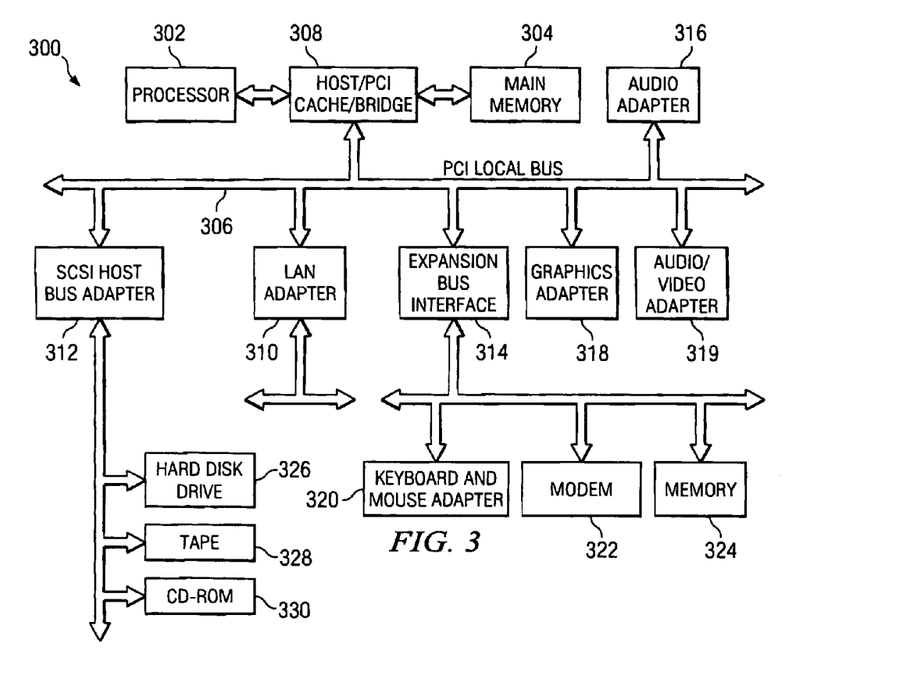
FIG. 3 is an exemplary diagram of a client computing system as depicted in accordance with a preferred embodiment of the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, an apparatus, and computer instructions for autonomic policy-based thermal management in a data processing system. The present invention provides an autonomic management component for optimizing different system characteristics according to customer-valued goals. In a preferred embodiment, the autonomic management component may be implemented as a firmware component in a data processing system, such as data processing system 200 in FIG. 2 and data processing system 300 in FIG. 3, that collaborates with different hardware to provide a base set of functionalities for monitoring and adjusting different system characteristics.

Based on customer optimization goals, the autonomic management component selects the appropriate control algorithms to perform the base set of functionalities in order to optimize system behavior. Control algorithms are software components that read information from specific system characteristic sensors and modify behavior of the specific hardware based on the information in order to meet a customer-valued goal. For example, the control algorithm may determine the amount of margin available in processor temperature. If the processor temperature is cooler than the maximum allowed processor temperature as specified by the processor manufacturer, the control algorithm may increase the processor frequency voltage according to a customer desired performance.

In addition, the control algorithm may be used to mitigate out-of-spec conditions, such as excess ambient conditions or degraded cooling capabilities. For example, if the sensors indicated that the processor temperature becomes too high, the control algorithm may reduce the processor frequency and notifies the customer of the decreased performance. This helps to improve reliability, availability, and serviceability of the system, since out-of-spec conditions are automatically detected and controlled to avoid emergency shutdowns.

In order to monitor different system characteristics, the present invention provides sensors that are implemented in hardware. The sensors monitor key parameters, such as chip temperature, ambient condition, and power supply current. Based on the key parameters, control algorithms are selected by the autonomic management to determine required parameter adjustments or effectors. Control algorithms determine required adjustments based on a customer policy or a profile. Examples of effectors include voltage variations, frequency changes, fan speed adjustments, and processor throttling.

As mentioned above, the autonomic management component may be implemented in firmware that analyzes information read from the sensors and determine the appropriate control algorithms for parameter adjustments. The control algorithms determine the amount of parameter adjustments needed based on the sensor input and an optimization goal specified by the customer. The customer may specify the optimization goal via a profile or a system policy. Each control algorithm is specific to a given customer optimization goal and is selected by the autonomic management component based on that goal.

For example, a control algorithm may be customized for high performance settings. In this case, the management component may detect values from the sensors and determines that the system has reached a warning temperature. In turn, the autonomic management component notifies the appropriate control algorithm to adjust parameters that will result in a lower temperature, since the control algorithm has knowledge of the acceptable temperature according to the customer optimization goal. The autonomic management component may also send an alert to system software or to the customer.

In addition to the base set of functionalities, the control algorithms may be customized to implement specialized functions. In this way, a customer may fine-tune the system according to the individual needs. Since control algorithms are implemented in firmware, application programming interface may be use to add specialized control algorithms.

Since customer optimization goals specified in a profile can be changed dynamically, different control algorithms may be employed by the autonomic management component to change system behavior accordingly. Thus, a plug-in mechanism may be implemented in the autonomic management component to select from the set of available control algorithms.

Figure 4:
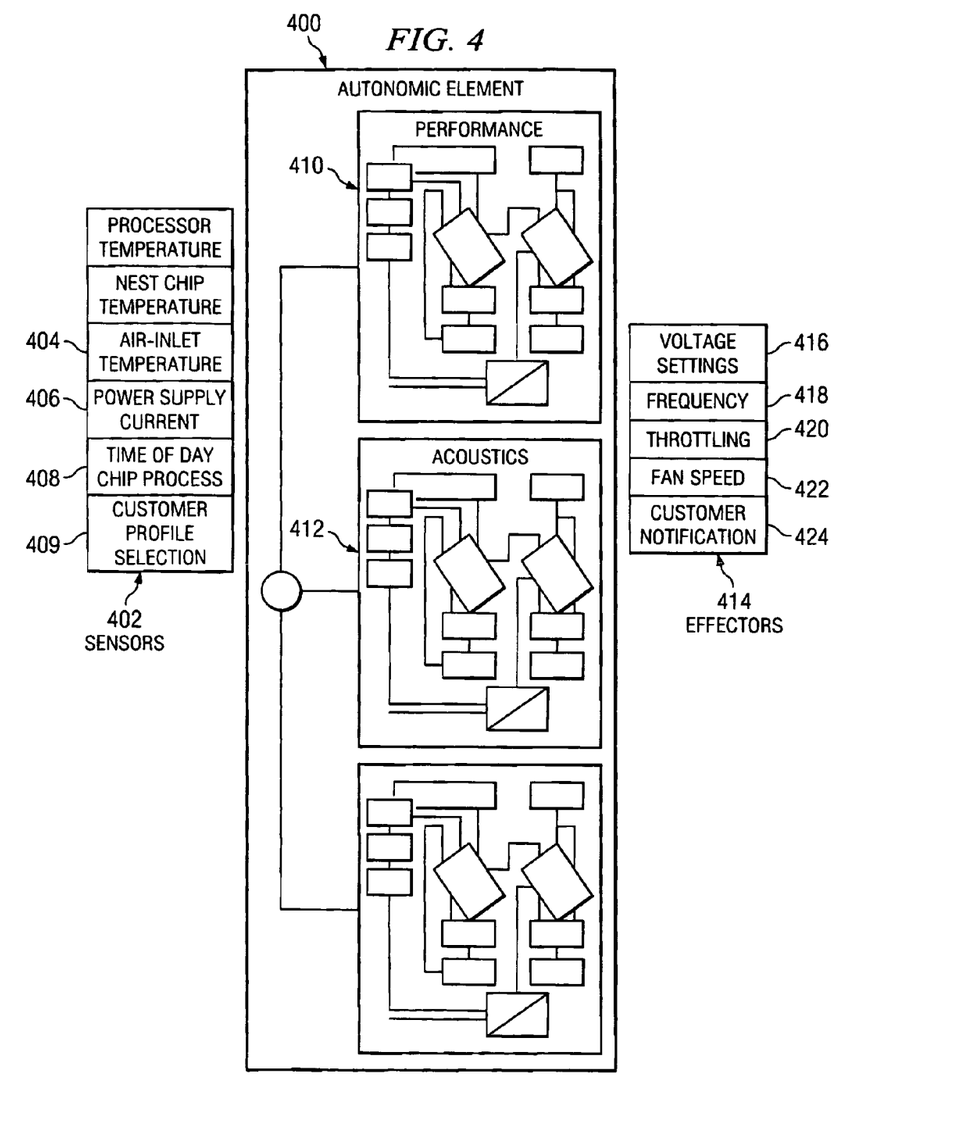
FIG. 4 is a diagram illustrating components for an autonomic policy-based thermal management system as depicted in accordance with a preferred embodiment of the present invention.

Turning now to FIG. 4, a diagram illustrating components for an autonomic policy-based thermal management system is depicted in accordance with a preferred embodiment of the present invention. As shown in FIG. 4, autonomic manager 400 may be implemented as a firmware component in a data processing system, such as data processing system 200 in FIG. 2 or data processing system 300 in FIG. 3. The firmware component may be computer implemented instructions executed by one or more processors, such as processors 202 and 204 in FIG. 2, or a single processor, such as processor 302 in FIG. 3.

Autonomic manager 400 reads information from a number of sensors 402, which measures values in a specific hardware component. For example, air-inlet temperature sensor 404 provides measurements for air-inlet temperature. Power supply current sensor 406 provides measurements for power supply current. Time of data sensor 408 provides measurements for time of the day.

Autonomic manager 400 also selects a control algorithm from a plurality of control algorithms based on a customer profile or policy 409. Examples of control algorithms include performance algorithm 410 for controlling performance, and acoustics algorithm 412 for controlling acoustics. Based on the values measured from sensors 402, the selected control algorithm adjusts required parameters or effectors 414 to optimize system behavior. Examples of effectors include voltage settings 416, processor frequency 418, throttling 420, and fan speed 422. For example, the control algorithm may adjust fan speed if a warning temperature is measured. At the same time, autonomic component 400 may send a notification 424 to notify the customer of the warning temperature.

Figure 5:
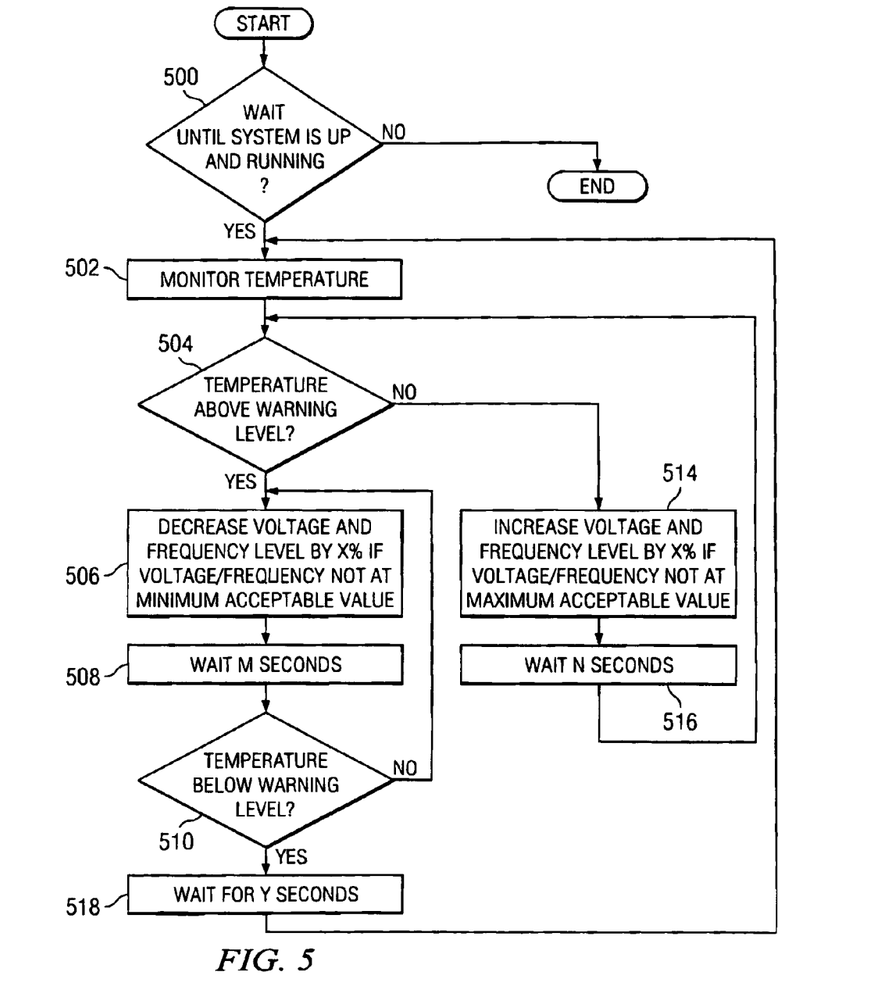
FIG. 5 is a flowchart of an exemplary control algorithm for performance optimization as depicted in accordance with a preferred embodiment of the present invention.

Turning now to FIG. 5, a flowchart of an exemplary control algorithm for performance optimization is depicted in accordance with a preferred embodiment of the present invention. As shown in FIG. 5, the process waits till the system is up and running (step 500).

When the system is up and running, the control algorithm monitors the temperature (step 502) and determines if the temperature is above the warning levels (step 504). If the temperature is above the warning level, the control algorithm decreases the voltage and frequency in programmable, perhaps empirically learned, percentage increment (step 506) if the voltage and frequency are not already at the minimum acceptable operating value and then waits for a number of seconds (step 508).

Turning back to step 504, if the temperature is not above the warning levels, the control algorithm increases the voltage and frequency levels to improve performance (step 514) if the voltage and frequency are not already at the maximum acceptable operating value and then waits a number of seconds (step 516). After time expires at step 516, the control algorithm returns to step 504 to determine if the temperature is above the warning levels.

Turning back to step 508, after time expires, the control algorithm determines if the temperature is below the warning levels (step 510). If the temperature is not below the warning levels, the process returns to step 506 to continue to decrease the voltage and frequency levels by small increments. If the temperature is below the warning levels, the control algorithm waits for a specified time (step 518) and then the entire process returns to step 502 to continue monitoring the temperature until the system is shutdown. In such a manner, the algorithm constantly evaluates the optimal frequency/voltage combination to yield the highest performance without exceeding the warning temperature level.

Figure 6:
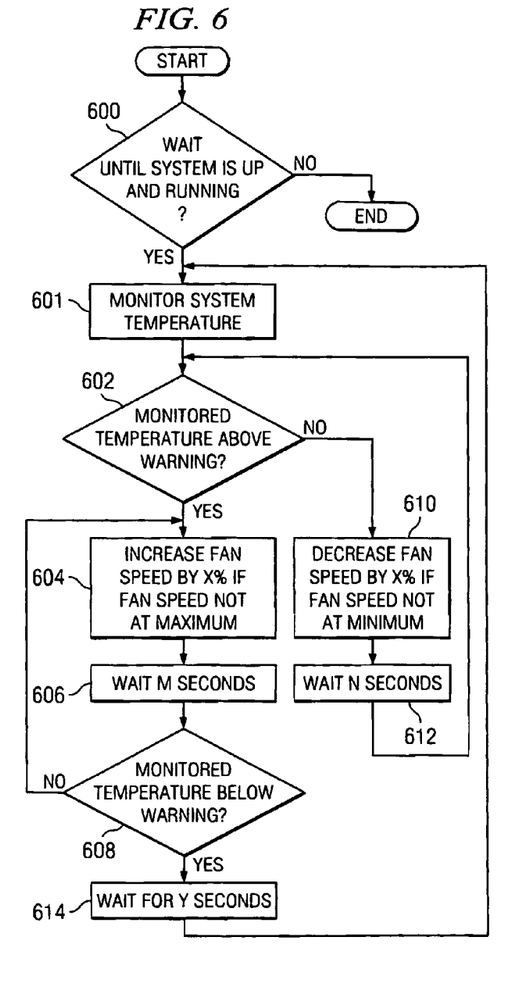
FIG. 6 is a flowchart of an exemplary control algorithm for acoustics optimized systems as depicted in accordance with a preferred embodiment of the present invention.

Turning now to FIG. 6, a flowchart of an exemplary control algorithm for acoustics optimized systems is depicted in accordance with a preferred embodiment of the present invention. As shown in FIG. 5, the process begins when process waits until system is up and running (step 600).

When the system is up and running, the control algorithm monitors the system temperature (step 601) and determines if the system temperature is above warning (step 602). If the system temperature is not above warning, the control algorithm decreases the fan speed by small increments (step 610) if the fan speed is not already at a minimum and then waits a number of seconds (step 612). In this example, fan speed is used as an illustrative effector. Other effectors, such as voltage, frequency and throttling mechanism may also be adjusted by the control algorithm.

After time expires at step 612 the control algorithm then continues to determine if the system temperature is above warning (step 602. If the system temperature is above warning, the control algorithm increases the fan speed by a programmable, perhaps empirically learned, percentage (step 604) if the fan speed is not already at the maximum and then waits a number of seconds (step 606). After time expires at step 606, the control algorithm returns to step 608 to determine if the system temperature is below warning.

At step 608, if the system is below warning, the control algorithm returns to wait for a specified amount of time (step 614) and the entire process then returns to step 601 to continue monitoring the system temperature until the system is shutdown. In such a manner, the algorithm constantly evaluates the lowest fan speed to yield the best acoustics without exceeding the warning temperature. Thus, the above example control algorithms illustrates that the control algorithm monitors values measured by sensors and determines whether performance and/or acoustics can be improved. Accordingly, the control algorithm makes the appropriate adjustments.

Turning back to FIG. 4, hardware sensors 402 may be temperature sensitive that are placed in regions of high power density and may be monitored by hardware state machines. In case of preset warnings or critical temperature levels are crossed, the hardware state machines may trigger interrupts or attentions to notify the thermal management component and the currently selected control algorithm.

Autonomic component 400 implements base services for voltage and frequency variation or effectors. Examples of base services include frequency slewing, and voltage adjustments depending on power subsystem capabilities. Autonomic component 400 also includes control algorithm that determines system behavior based on customer policies, for example, optimized performance, acoustics, and power dissipation. Additional control algorithms may be plugged in to the autonomic component for flexible adjustment of customer policies.

Figure 7:
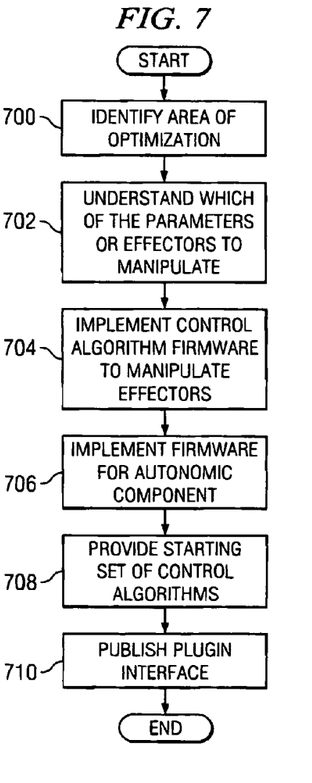
FIG. 7 is a flowchart of an exemplary process for implementing an autonomic policy-based thermal management as depicted in accordance with a preferred embodiment of the present invention.

Turning now to FIG. 7, a flowchart of an exemplary process for implementing an autonomic policy-based thermal management is depicted in accordance with a preferred embodiment of the present invention. As shown in FIG. 7, the process begins when designers first identify areas of optimization (step 700) and understands which of the parameters or effectors to manipulate based on the customer profile or policy (step 702).

Next, the designer may implement control algorithm firmware, which has the capability to manipulate the parameters or effectors (step 704). Then, designers may implement firmware for the autonomic management component, which dynamically selects different algorithms to perform monitoring and adjustments of the effectors (step 706). At this time, the designers may implement an application programming interface to plug in additional control algorithms.

Once the autonomic component and control algorithms are implemented, the designer provides a starting set of control algorithms to be used by the autonomic management component (step 708). The starting set of control algorithm should have preset values for each of the effectors. Once the starting set of algorithms is provided, the designer may publish the plugin interface to customers (step 710), such that the customers may implement customized control algorithm.

Thus, with processes illustrated in FIGS. 6 and 7, the control algorithm may adjust voltage and frequency level and fan speed to find an optimal tradeoff between acoustic and performance goals according to the customer optimization goal specified in the policy.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution.

Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, other resource condition management may be performed using the mechanism of the present invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for autonomic policy-based thermal management in a data processing system having at least one processor, the method comprising:
   (1) selecting at least one algorithm from a plurality of algorithms to manipulate one or more effectors, in the data processing system, based on a user policy;
   (2) in response to selecting an algorithm for performance, performing the following steps:
   (3) monitoring a temperature of the data processing system to form a monitored temperature;
   (4) determining if the monitored temperature is above a warning temperature;
   (5) in response to the monitored temperature being above the warning temperature:
      (a) determining if at least one effector is above a minimum acceptable value;
      (b) in response to the at least one effector being above the minimum acceptable value, decreasing the at least one effector by an incremental amount according to a selected algorithm;

(c) in response to determining that the monitored temperature is above the warning temperature, returning to step (5)(a); and (d) in response to determining that the monitored temperature is below the warning temperature, returning to step (3); and (6) in response to the monitored temperature being below the warning temperature:

(e) determining if the at least one effector is below a maximum acceptable value;

(f) in response to the at least one effector being below the maximum acceptable value, increasing the at least one effector by the incremental amount according to the selected algorithm; and (g) returning to step (4).

2. The method of claim 1 further comprising:

(7) in response to selecting an algorithm for acoustics, performing the following steps:

(8) monitoring the temperature of the data processing system to form the monitored temperature;

(9) determining if the monitored temperature is above the warning temperature;

(10) in response to the monitored temperature being above the warning temperature:

(h) determining if the at least one effector is below the maximum acceptable value;

(i) in response to the at least one effector being below the maximum acceptable value, increasing the at least one effector by the incremental amount according to the selected algorithm;

(j) in response to determining that the monitored temperature is above the warning temperature, returning to step (10)(h); and (k) in response to determining that the monitored temperature is below the warning temperature, returning to step (8); and (11) in response to the monitored temperature being below the warning temperature:

(1) determining if the at least one effector is above the minimum acceptable value;

(m) in response to the at least one effector being above the minimum acceptable value, decreasing the at least one effector by the incremental amount according to the selected algorithm; and (n) returning to step (9).

3. The method of claim 2 further comprising:

(12) selecting an algorithm for optimizing both performance and acoustics; and (13) adjusting the at least one effector to find an optimal tradeoff between the performance and the acoustics.

4. The method of claim 2, wherein the at least one effector comprises a voltage level, a frequency of the at least one processor, a fan speed, or a processor throttling.

5. The method of claim 1 further comprising:

(15) determining the incremental amount using one of a programmed and an empirically learned amount; and (16) in response to adjusting the at least one effector by the incremental amount, waiting for a specified period of time.

6. The method of claim 1 further comprising:

(17) notifying the user if the monitored temperature is above the warning temperature and if one of the following conditions exists:

(i) at least one effector reaches the minimum acceptable operating level; or (ii) at least one effector reaches the maximum acceptable operating level.

7. The method of claim 1 further comprising:

(18) reading a value of the at least one effector from at least one sensor from a plurality of sensors in the data processing system, wherein the at least one sensor comprises an air-inlet temperature sensor, a processor temperature sensor, a power supply current sensor, or a time of day sensor.

8. The method of claim 1, wherein an automatic management component comprises the plurality of algorithms, and wherein the automatic management component performs the autonomic policy-based thermal management in the data processing system.

9. The method of claim 1, wherein the user policy dynamically changes.

10. A data processing system comprising:

at least one processor;

an autonomic management component coupled to a firmware in the data processing system, wherein the at least one processor executes the autonomic management component; and at least one algorithm from a plurality of algorithms for manipulating one or more effectors, wherein the autonomic management component comprises the plurality of algorithms, and wherein the autonomic management component selects the at least one algorithm from the plurality of algorithms, and wherein the plurality of algorithms comprises an algorithm for performance which performs the following steps:

(1) monitoring a temperature of the data processing system to form a monitored temperature;

(2) determining if the monitored temperature is above a warning temperature;

(3) in response to the monitored temperature being above the warning temperature:

(a) determining if at least one effector is above a minimum acceptable value;

(b) in response to the at least one effector being above the minimum acceptable value, decreasing the at least one effector by an incremental amount according to the selected algorithm;

(c) in response to determining that the monitored temperature is above the warning temperature, returning to step (3)(a); and (d) in response to determining that the monitored temperature is below the warning temperature, returning to step (1); and (4) in response to the monitored temperature being below the warning temperature:

(e) determining if the at least one effector is below a maximum acceptable value;

(f) in response to the at least one effector being below the maximum acceptable value, increasing the at least one effector by the incremental amount according to the selected algorithm; and (g) returning to step (2).

11. The data processing system of claim 10, wherein the plurality of control algorithms further comprises an algorithm for acoustics which performs the following steps:

(5) monitoring the temperature of the data processing system to form the monitored temperature;

(6) determining if the monitored temperature is above the warning temperature;

(7) in response to the monitored temperature being above the warning temperature:

(h) determining if the at least one effector is below the maximum acceptable value;

(i) in response to the at least one effector being below the maximum acceptable value, increasing the at least one effector by the incremental amount according to the selected algorithm;

(j) in response to determining that the monitored temperature is above the warning temperature, returning to step (7)(h); and (k) in response to determining that the monitored temperature is below the warning temperature, returning to step (5); and (8) in response to the monitored temperature being below the warning temperature:

(l) determining if the at least one effector is above the minimum acceptable value;

(m) in response to the at least one effector being above the minimum acceptable value, decreasing the at least one effector by the incremental amount according to the selected algorithm; and (n) returning to step (6).

12. The data processing system of claim 11, wherein the plurality of algorithms further comprises an algorithm for optimizing both performance and acoustics, and wherein the algorithm for optimizing both performance and acoustics performs the step of adjusting the at least one effector to find an optimal tradeoff between the performance and the acoustics.

13. The data processing system of claim 11, wherein the at least one effector comprises a voltage level, a frequency of the at least one processor, a fan speed, or a processor throttling.

14. The data processing system of claim 10, wherein the at least one algorithm notifies the user if the monitored temperature level is above the warning temperature and if one of the following conditions exists:

(i) at least one effector reaches the minimum acceptable operating level; or (ii) at least one effector reaches the maximum acceptable operating level.

15. The data processing system of claim 10, wherein the at least one algorithm further performs the following steps:

(9) determining the incremental amount using one of a programmed and an empirically learned amount; and (10) in response to adjusting the at least one effector by the incremental amount, waiting for a specific period of time.

16. A computer program product comprising a computer usable medium including instructions for autonomic policy-based thermal management in a data processing system having at least one processor, the computer program product comprising:

(1) instructions for selecting at least one algorithm from a plurality of algorithms to manipulate one or more effectors, in the data processing system, based on a user policy;

(2) in response to selecting an algorithm for performance, instructions for performing the following steps:

(3) instructions for monitoring a temperature of the data processing system to form a monitored temperature;

(4) instructions for determining if the monitored temperature is above a warning temperature;

(5) in response to the monitored temperature being above the warning temperature:

(a) instructions for determining if at least one effector is above a minimum acceptable value;

(b) in response to the at least one effector being above the minimum acceptable value, instructions for decreasing the at least one effector by an incremental amount according to the selected algorithm;

(c) in response to determining that the monitored temperature is above the warning temperature, instructions for returning to step (5)(a); and (d) in response to determining that the monitored temperature is below the warning temperature, instructions for returning to step (3); and (6) in response to the monitored temperature being below the warning temperature:

(e) instructions for determining if the at least one effector is below a maximum acceptable value;

(f) in response to the at least one effector being below the maximum acceptable value, instructions for increasing the at least one effector by an incremental amount according to the selected algorithm; and (g) instructions for returning to step (4).

17. The computer program product of claim 16 further comprising:

(7) in response to selecting an algorithm for acoustics, instructions for performing the following steps:

(8) instructions for monitoring the temperature of the data processing system to form the monitored temperature;

(9) instructions for determining if the monitored temperature is above the warning temperature;

(10) in response to the monitored temperature being above the warning temperature:

(h) instructions for determining if the at least one effector is below the maximum acceptable value;

(i) in response to the at least one effector being below the maximum acceptable value, instructions for increasing the at least one effector by the incremental amount according to the selected algorithm;

(j) in response to determining that the monitored temperature is above the warning temperature, instructions for returning to step (10)(h); and (k) in response to determining that the monitored temperature is below the warning temperature, instructions for returning to step (8); and (11) in response to the monitored temperature being below the warning temperature:

(l) instructions for determining if the at least one effector is above the minimum acceptable value;

(m) in response to the at least one effector being above the minimum acceptable value, instructions for decreasing the at least one effector by an incremental amount according to the selected algorithm; and (n) instructions for returning to step (9).

18. The computer program product of claim 17, wherein the at least one effector comprises a voltage level, a frequency of the at least one processor, a fan speed, or a processor throttling.

19. The computer program product of claim 16 further comprising:

(12) instructions for notifying the user if the monitored temperature level is above the warning temperature and if one of the following conditions exists:

(i) at least one effector reaches the minimum acceptable operating level; or (ii) at least one effector reaches the maximum acceptable operating level.

20. The computer program product of claim 16 further comprising:

(13) instructions for determining the incremental amount using one of a programmed and an empirically learned amount; and (14) in response to adjusting the at least one effector by the incremental amount, instructions for waiting for a specific period of time.

* * * * *